April 2, 1929.  T. H. THOMAS ET AL  1,707,289
FLUID PRESSURE BRAKE
Filed Nov. 30, 1927
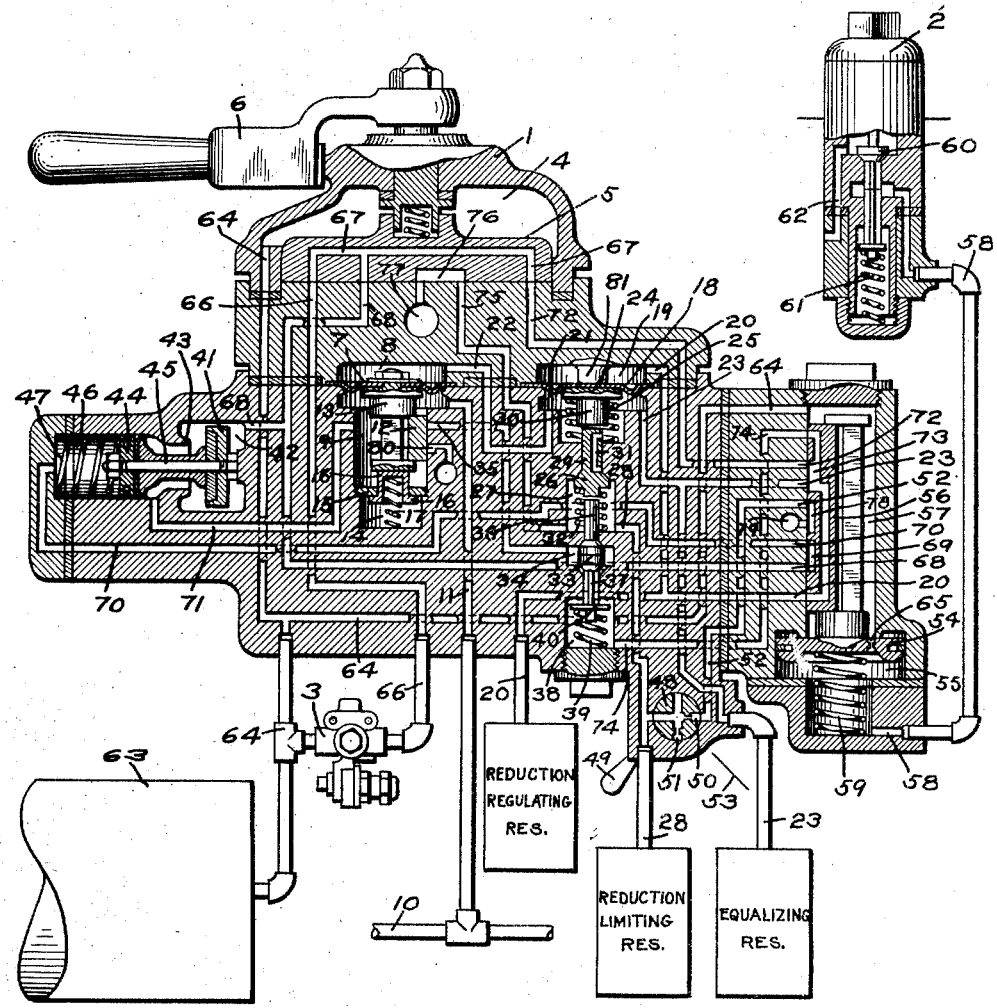
INVENTOR
THOMAS H. THOMAS
AND
CLAUDE A. NELSON
BY Wm. M. Cady
ATTORNEY Patented Apr. 2, 1929.

1,707,289

UNITED STATES PATENT OFFICE.

THOMAS H. THOMAS, OF EDGEWOOD, AND CLAUDE A. NELSON, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed November 30, 1927. Serial No. 236,671.

This invention relates to fluid pressure brakes and more particularly to locomotive brake equipment of the type having means for automatically effecting an application of the brakes.

In order to apply the brakes on a train in such a manner as to avoid harsh or rough gathering of the slack between the cars, which might result in wrecking the train, the brake pipe reduction may be started at a predetermined slow rate, so as to cause the train slack to be gently gathered, and after the slack is thus gathered, the rate of reducing the brake pipe pressure can be increased, so as to effect the desired application of the brakes.

One object of our invention is to provide improved means for automatically effecting a brake pipe reduction at two different rates, the initial predetermined degree of such reduction to be made at a slow rate and the second portion of such reduction to be made at a faster rate.

In effecting a brake pipe reduction on a train having a substantially airtight brake pipe, the rate of brake pipe reduction is governed by the brake pipe discharge valve, which is opened by the equalizing piston, when the pressure in the equalizing reservoir is reduced below that in the brake pipe. However, under some conditions, such as brake pipe leakage and dependent upon the length of the train, the brake pipe pressure acting on the equalizing piston may reduce at a faster rate than the equalizing reservoir pressure is reduced. This is undesirable, particularly during the initial reduction, since too fast a rate of reduction in brake pipe pressure tends to cause a severe brake application and a consequent rough gathering of the train slack.

Another object of our invention is to provide improved means for preventing the brake pipe pressure from reducing at a greater rate than would be effected by operation of the equalizing discharge valve mechanism.

After the train slack is gathered, the brake pipe pressure can be reduced at a more rapid rate than during the initial reduction, so that under such conditions, it is not so necessary to prevent the brake pipe pressure from reducing faster than the equalizing reservoir pressure is reduced. Furthermore, after the brakes are fully applied, it is undesirable to have the brake pipe pressure maintained equal to the reduced equalizing reservoir pressure under some conditions, such as in case there is leakage of fluid under pressure from any of the auxiliary reservoirs on the cars in the train, because such leakage tends to reduce the auxiliary reservoir pressure below the brake pipe pressure and cause an undesired release of the brakes on the car or cars where such leakage is effective.

Another object of our invention is to permit the rate of the second portion of the brake pipe reduction to be governed by the effect of brake pipe leakage in addition to the opening past the brake pipe discharge valve, in order to prevent the undesired release of brakes, in the manner described above.

The severity of slack action in a train decreases in proportion to the decrease in train length, so that the rate of effecting a brake pipe reduction can be increased as the train length decreases.

Another object of our invention is to provide manually controlled means for varying the rate of effecting a reduction in equalizing reservoir pressure, in accordance with the train length.

Other objects and advantages will appear in the following more detailed description of our invention.

In the accompanying drawing, the single figure is a diagrammatic view of a fluid pressure train control apparatus embodying our invention.

As shown in the drawing, the train control apparatus comprises an automatic brake valve device 1, a magnet valve device 2 and a feed valve device 3.

The automatic brake valve device comprises a casing having a chamber 4 containing a rotary valve 5 adapted to be operated by a handle 6 and an equalizing valve mechanism comprising a diaphragm 7, having at one side a chamber 8 connected to an equalizing reservoir by means to be hereinafter described, and having at the opposite side a valve chamber 9 connected to a brake pipe 10 through a passage 11. The valve chamber 9 contains a slide valve 12 disposed between two shoulders on the stem of a diaphragm head 13, which head is secured to the diaphragm 7. A chamber 14 is separated from the valve chamber 9 by an apertured washer 15 having screw-threaded engagement in the wall of the valve chamber 9. A spring retainer 16 is adapted to operate through the aperture in the washer 15 and the movement of such retainer is limited in one direction by a shoulder 16, formed exteriorly on the lower edge of the retainer, which shoulder is adapted to engage the washer. A spring 17, interposed between the retainer 16 and a wall of chamber 14, is adapted to normally hold the retainer shoulder 16 in engagement with the washer 15, in which position the stem of the diaphragm head 13 is adapted to engage the retainer and thus maintain the equalizing slide valve 12 in its normal release position, as shown in the drawing.

A reduction regulating valve mechanism is also disposed in the brake valve casing and comprises a diaphragm 18, having at one side a chamber 19, which is connected to a reduction regulating reservoir through a passage and pipe 20, and having at the opposite side a chamber 21, which is connected to the equalizing diaphragm chamber 8 through a passage 22, and which is also connected to an equalizing reservoir through a passage and pipe 23. The chamber 21 contains a diaphragm head 24 adapted to be held in engagement with the diaphragm 18 by the pressure of a spring 25. A valve 26, contained in a chamber 27, which chamber is connected to a reduction limiting reservoir through a passage and pipe 28, has a stem 29 extending through an opening in the casing wall and into the diaphragm head chamber 21, wherein such valve stem is adapted to be engaged by the depending stem 30 of the diaphragm head 24. The valve stem 29 is provided with a port 31, which port is adapted to permit communication between chamber 21 and chamber 27, when the valve 26 is unseated, but when such valve is seated by the pressure of a spring 32, contained in the chamber 27, such communication is cut off.

A double beat valve 33 is contained in a chamber 34, which is connected to the seat of the equalizing slide valve by passage 35, and said valve has at one side a solid stem 36 extending through a wall of the casing into the valve chamber 27, wherein such stem is adapted to be engaged by the valve 26. The double beat valve 33 has at the opposite side a fluted stem 37 extending through a wall of the casing into a chamber 38, wherein a spring 39 engages a thrust washer 40 mounted on the valve stem 37, and tends to seat the double beat valve 33 in the upward position, as shown in the drawing.

The casing of the brake valve device also contains a cut-off valve mechanism comprising a cut-off valve 41 contained in a chamber 42 and adapted in one position to seal on a seat ring 43. A cut-off valve piston 44, which is operatively connected to the cut-off valve 41 by a stem 45, is contained in a chamber 46, which chamber also contains a spring 47 acting on the cut-off valve piston.

A plug valve 48 is contained in a chamber in the brake valve device and is adapted to be operated by a handle 49. The plug valve contains two restricted ports 50 and 51 of different sizes, the port 50 being adapted to connect passage 28 from the reduction limiting reservoir to a passage 52, when the valve operating handle 49 is in the position shown in the drawing. With the valve operating handle 49 in the position indicated by the line 53, the restricted port 51 connects passages 28 and 52.

Preferably associated with the brake valve device is a brake application valve mechanism, which comprises a piston 54 contained in a chamber 55 and a slide valve 56 contained in a valve chamber 57 and adapted to be operated by the piston 54. The piston chamber 55 is connected through a passage and pipe 58 to the magnet valve device 2 and contains a spring 59 tending to hold the piston 54 and slide valve 56 in the release position, as shown in the drawing.

The magnet valve device 2 comprises a magnet adapted to control the operation of a valve 60, which is urged away from its seat by a spring 61. The valve 60 is adapted to control communication between the application piston chamber 55 and the atmosphere, through passage and pipe 58 and the atmospheric exhaust passage 62. The magnet of the magnet valve device is adapted to be controlled by train control apparatus (not shown), in such a manner that when the train is operating in territory where the track conditions are favorable, such magnet is energized and operates to seat valve 60, but when operating in territory where the track conditions are unfavorable, the magnet is deenergized and the valve 60 is unseated by the spring 61.

In operation, fluid under pressure is supplied from a main reservoir 63 to the rotary valve chamber 4, to the application valve chamber 57 and to the feed valve device 3 through pipe and passage 64. Fluid from the application valve chamber then flows through a port 65 in the application piston 54 and into the application piston chamber 55 and from thence through passage and pipe 58 to the magnet valve device 2. With a train operating in territory governed by favorable track conditions, the magnet of the magnet valve device is energized, thereby seating valve 60, so that a fluid pressure builds up in the application piston chamber 55 equal to the pressure of the fluid in the application valve chamber 57. The pressure of spring 59 is thereby permitted to push and normally hold the application piston 54 and slide valve 56 in the release position, as shown in the drawing.

Fluid at the usual reduced pressure employed in the brake pipe is supplied by the feed valve device 3 to the seat of the rotary valve 5 through pipe and passage 66. With the brake valve device in running position, as shown in the drawing, fluid at feed valve pressure flows from passage 66 to the cut-off valve piston chamber 46 by way of cavity 67 in the rotary valve passage 68, cavity 69 in the application slide valve 56, and passage 70. Fluid at feed valve pressure also flows from passage 68 into the cut-off valve chamber 42. With the brake system uncharged, the cut-off valve 41 is unseated by the pressure of spring 47 and in charging, since the fluid pressure builds up on the opposite sides of the cut-off valve piston 44 at the same time, the cut-off valve 41 remains unseated and permits fluid at feed valve pressure, to flow from chamber 42 to the brake pipe 10 through passage 71, the equalizing valve chamber 9 and passage 11, thereby charging the brake pipe.

Fluid at feed valve pressure also flows from cavity 67 in the rotary valve 5 to the equalizing reservoir and to the reduction regulating valve diaphragm chamber 21 by way of passage 72, cavity 73 in the application slide valve 56 and passage and pipe 23 and from the diaphragm chamber 21 to the equalizing diaphragm chamber 8 through passage 22. The equalizing reservoir pressure and brake pipe pressure acting on the equalizing diaphragm 7 thus being substantially equal, the equalizing mechanism is held in the position shown in the drawing, in which position the stem of the diaphragm head 13 rests on the spring retainer 16.

Fluid at feed valve pressure also flows from cavity 73 in the application slide valve to the reduction regulating valve diaphragm chamber 19 and the reduction regulating reservoir by way of passage 20. The fluid pressures thus being substantially equal on the opposite sides of the reduction regulating diaphragm 18, the pressure of spring 25 holds the diaphragm 18 and the diaphragm head 24 against the stop lug 81, in which position the valve 26 is seated by spring 32 and the double beat valve 33 is seated in the upper position, as shown in the drawing, by spring 39. With the double beat valve 33 seated in the upper position, fluid at feed valve pressure is permitted to flow from cavity 73 in the application slide valve 56 to the seat of the equalizing slide valve 12, through passage 74, spring chamber 38, past the fluted stem 37 of the double beat valve 33, through the double beat valve chamber 34 and from thence through passage 35.

With the brake valve handle 6 in running position, the reduction limiting reservoir is connected to the atmosphere through passage 28, valve chamber 27, passage 75, cavity 76 in the rotary valve 5 and an atmospheric exhaust passage 77.

If the track conditions become unfavorable, the magnet of the magnet valve device 2 becomes deenergized. The valve 60 is then unseated by spring 61, which permits the fluid under pressure in the application piston chamber 55 to be vented to the atmosphere through passage and pipe 58, and passage 62. The main reservoir pressure in the application valve chamber 57 then shifts the application piston 54 and slide valve 56 downwardly to application position, against the pressure of spring 59.

In application position of the application slide valve, the cut-off valve piston chamber 46 is vented to the atmosphere through passage 70, cavity 78 in the application slide valve and the atmospheric exhaust passage 79. The brake pipe pressure acting on the opposite side of the cut-off valve piston 44 then shifts the cut-off valve piston and cut-off valve 41 outwardly against spring 47, thereby seating the cut-off valve 41 against the seat ring 43, so as to prevent further flow of fluid from the feed valve device to the brake pipe. The equalizing diaphragm chamber 8, the reduction regulating valve diaphragm chamber 21 and the equalizing reservoir are connected to the reduction limiting reservoir through passage 23, cavity 73 in the application slide valve, passage 52, choked port 50 in the plug valve 48 and passage and pipe 28. The equalizing reservoir pressure is thereby permitted to reduce at a slow rate, as governed by the choked port 50. The higher brake pipe pressure, acting in the equalizing valve chamber 9, then deflects the equalizing diaphragm 7 upwardly, which causes the equalizing slide valve 12 to partially uncover the restricted brake pipe discharge port 80 and permit fluid under pressure to flow from the brake pipe through passage 11, valve chamber 9 and port 80 to the atmosphere, thereby causing a brake pipe reduction at a rate governed by the slow rate of decrease in the equalizing reservoir pressure which is effective in diaphragm chamber 8.

With the application slide valve 56 in application position, the passage 20 leading to the reduction regulating valve diaphragm chamber 19 and reduction regulating reservoir is lapped, so that when effecting a brake pipe reduction, the pressure in said diaphragm chamber and reservoir is bottled up.

When the equalizing reservoir pressure becomes reduced a predetermined degree. and by an amount substantially equal to or slightly exceeding the pressure of spring 25, the reduction regulating reservoir pressure deflects the diaphragm 18 downwardly and unseats valve 26, which permits fluid under pressure from the equalizing reservoir to flow to the reduction limiting reservoir through port 31 in the valve stem 29, in addition to the flow through the choked port 50 in the plug valve 48, which latter flow continues as during the initial portion of the brake pipe reduction. This causes the equalizing reservoir pressure to reduce at a faster rate than the initial rate of reduction. Such faster rate of reduction being effective in the equalizing diaphragm chamber 8 causes the equalizing valve mechanism to operate the slide valve 12, so as to effect a larger opening of the brake pipe discharge port 80 and thereby permit the brake pipe pressure to be reduced at a faster rate.

If it is desired to limit the degree of brake pipe reduction to the maximum degree necessary to fully apply the brakes, the brake valve handle 6 is moved to lap position, in which position passage 75 from the reduction limiting reservoir is lapped, so that the total decrease in equalizing reservoir pressure is thereby limited to equalization into the reduction limiting reservoir. If the atmospheric connection of the reduction limiting reservoir is not lapped, then the equalizing reservoir fluid will be completely vented to the atmosphere and will permit the equalizing valve mechanism to completely vent the brake pipe.

If there is sufficient leakage of fluid under pressure from the brake pipe to the atmosphere to cause the brake pipe pressure to reduce at a faster rate than the equalizing reservoir pressure is reduced, then the equalizing reservoir pressure becomes higher than the brake pipe pressure and deflects the equalizing diaphragm 7 downwardly, which causes the slide valve 12 to be shifted so as to uncover the passage 35. With the double beat valve 33 seated in the upper position, as shown in the drawing, and the application slide valve 56 in application position, the passage 35 is connected to the application slide valve chamber 57 through valve chamber 34, spring chamber 38 and passage 74, so that fluid at main reservoir pressure is thereby permitted to flow from the application valve chamber to the equalizing valve chamber 9 and from thence to brake pipe 10, thereby causing the pressure of brake pipe fluid to be increased. The brake pipe pressure can not be increased to a degree higher than the reducing equalizing reservoir pressure however, since when the brake pipe pressure becomes substantially equal to the equalizing reservoir pressure, the equalizing valve mechanism operates to prevent further flow of main reservoir fluid to the brake pipe.

In the manner just described, the brake pipe pressure is maintained substantially equal to the reducing equalizing reservoir pressure, as long as the double beat valve 33 remains seated in the position shown in the drawing. At the end of the first portion of the reduction, the reduction regulating valve diaphragm 18 operates as hereinbefore described, to unseat valve 26 in order to start the faster rate of reduction in equalizing reservoir pressure. Unseating of valve 26 seats the double beat valve 33 in the lower position and thereby cuts off communication between the spring chamber 38 and valve chamber 34, so that during the second portion of the brake pipe reduction, if the degree of brake pipe leakage is such as to cause the brake pipe pressure to reduce faster than the equalizing reservoir pressure is reduced, fluid under pressure can not flow from the main reservoir to the brake pipe in order to maintain the rate of pressure drop therein, as during the initial portion of the reduction. This is desirable, because after the reduction in equalizing reservoir pressure is completed, if the brake pipe pressure is maintained equal to the reduced equalizing reservoir pressure, then if any of the auxiliary reservoirs on the cars leak, such leakage will permit the higher brake pipe pressure to cause an undesired release of the brakes on all cars having an auxiliary reservoir subject to such leakage.

As hereinbefore described, the initial slow rate of reduction in equalizing reservoir pressure is governed by the flow capacity of the choked port 50 in the plug valve 48 and the faster rate of the second portion of the reduction is governed by the combined flow capacities of the choked port 50 and the port 31 through the valve stem 29. Since the rate of effecting the brake pipe reduction can be increased as the train length is decreased, on account of the decrease in severity of the slack action, then for a shorter train, the plug valve 48 is turned until the handle 49 is in the position indicated by the line 53, in which position the choked port 51 in the plug valve 48 connects passages 28 and 52. The choked port 51 has greater flow area than the choked port 50 and consequently permits a faster rate of drop in equalizing reservoir pressure.

If it is desired to manually effect a reduction in brake pipe pressure, when the train control apparatus is in the release condition, as shown in the drawing, the brake valve handle 6 is moved to service position in the usual manner. In service position, the connection between the feed valve passage 66 and passage 68 leading to the brake pipe 10, is cut off through the port 67 in the rotary valve 5, so as to prevent further flow of fluid from the feed valve device 3 to the brake pipe 10, and at the same time, the passage 72 is connected to the atmospheric exhaust port 77 through a cavity (not shown) in the rotary valve 5. Passage 72 is connected to the equalizing reservoir and reduction regulating reservoir through cavity 73 in the application slide valve 56, when in release position, and from thence through passages and pipes 23 and 20, so that the pressure of the fluid in both of said reservoirs is permitted to reduce by flow through the atmospheric port 77. Such reduction is effective in the equalizing diaphragm chamber 8, which causes the equalizing valve mechanism to operate and permit a reduction in brake pipe pressure, in the same manner as hereinbefore described for a train control application of the brakes.

In manually effecting a brake application, the reduction regulating valve mechanism does not operate as when a train control application of the brakes is effected, because the reduction regulating reservoir pressure, effective in the diaphragm chamber 19, reduces with the equalizing reservoir pressure, which is effective in the diaphragm chamber 21. The fluid pressures thus remain substantially equal on the opposite sides of the reduction regulating valve diaphragm 18, so that spring 25 holds such diaphragm in its normal position, against the stop 81.

The capacity of the atmospheric port 77 is so proportioned to the combined volumes of the equalizing reservoir and reduction regulating reservoir as to effect a decrease in the pressure in such reservoirs at the same rate as with the usual locomotive brake equipment.

In charging the brake pipe, it is undesirable to have the equalizing reservoir become charged to a higher pressure than the pressure in the brake pipe, because if while charging it is desired to manually effect a brake pipe reduction or the train control apparatus operates to effect a reduction in brake pipe pressure, the higher equalizing reservoir pressure has to be reduced to equal the lower brake pipe pressure, before a reduction in brake pipe pressure can be started, which causes a delay in effecting a brake pipe reduction. In order to prevent the equalizing reservoir from becoming charged to a higher pressure than in the brake pipe, the equalizing reservoir is normally connected to the seat of the equalizing slide valve 12 by way of pipe and passage 23, cavity 73 in the application slide valve, passage 74, spring chamber 38, valve chamber 34 and passage 35, so that if the equalizing reservoir pressure starts to become greater than the brake pipe pressure, such equalizing reservoir pressure causes the equalizing valve mechanism to shift the slide valve 12 downwardly and uncover passage 35. This permits fluid under pressure to flow from the equalizing reservoir to brake pipe 10 through the valve chamber 9, so that as a result the pressures in the equalizing reservoir and brake pipe are always substantially equal in charging.

As shown in the drawing, the equalizing reservoir pressure can be reduced at only two different rates, as governed by the different size of the choked ports 50 and 51 in the plug valve 48. Under some conditions, it might be desirable to have more than two choked ports through the plug valve, so as to provide for more than two rates of reducing equalizing reservoir pressure.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. In a fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure and means for initially venting fluid under pressure from said reservoir at one rate to operate said valve device to vent fluid from the brake pipe and then at a faster rate.

2. In a fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure, means for initially venting fluid under pressure from said reservoir at one rate, and means operated upon a predetermined reduction in pressure in said reservoir for venting fluid from said reservoir at a more rapid rate.

3. In a fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure, means for initially venting fluid under pressure from said reservoir at one rate, and means operated upon a predetermined reduction in pressure in said reservoir for also venting fluid from said reservoir.

4. In a fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure, means for initially venting fluid under pressure from said reservoir at one rate, and means operated upon a predetermined reduction in pressure in said reservoir for opening an additional communication through which fluid is vented from said reservoir.

5. In fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure, means for initially venting fluid from said reservoir, a reduction regulating reservoir, and means subject to the opposing pressures of the equalizing reservoir and the reduction regulating reservoir and operated upon a predetermined reduction in pressure in the equalizing reservoir for also venting fluid from the equalizing reservoir.

6. In a fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure, a reduction reservoir, means for venting fluid from said equalizing reservoir to said reduction reservoir, a reduction regulating reservoir, and means subject to the opposing pressures of the equalizing reservoir and the reduction regulating reservoir and operated upon a predetermined reduction in pressure in the equalizing reservoir for venting fluid from the equalizing reservoir.

7. In a fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure, means for effecting a reduction in equalizing reservoir pressure in two stages, and means operative upon a reduction in brake pipe pressure below that in the equalizing reservoir for supplying fluid under pressure to the brake pipe only during the period the first stage of reduction is being effected.

8. In a fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure, means for effecting a reduction in equalizing reservoir pressure in two stages, means operative upon the brake pipe pressure reducing faster than the equalizing reservoir pressure is reducing for supplying fluid under pressure to the brake pipe, and valve means operative upon initiation of the second stage of reduction in brake pipe pressure for preventing the supply of fluid to the brake pipe.

9. In a fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure, means for effecting a reduction in equalizing reservoir pressure in two stages, means operative upon the brake pipe pressure reducing faster than the equalizing reservoir pressure is reducing for supplying fluid under pressure to the brake pipe, and valve means operative upon a predetermined reduction in pressure in the equalizing reservoir for preventing the supply of fluid to the brake pipe.

10. In a fluid pressure brake, the combination with a brake pipe and an equalizing reservoir, of a valve device subject to the opposing pressures of the brake pipe and equalizing reservoir and operated upon a reduction in equalizing reservoir pressure for effecting a reduction in brake pipe pressure, means for effecting a reduction in equalizing reservoir pressure in two stages, means operative upon the brake pipe pressure reducing faster than the equalizing reservoir pressure is reducing for supplying fluid under pressure to the brake pipe, and valve means operative upon a predetermined reduction in pressure in the equalizing reservoir for cutting off communication through which fluid under pressure is supplied to the brake pipe.

11. In a fluid pressure brake, the combination with a brake pipe, of means for first effecting a reduction in brake pipe pressure at one rate, means for then effecting a reduction in brake pipe pressure at a faster rate, and means for supplying fluid under pressure to the brake pipe to compensate for leakage from the brake pipe only during the reduction in brake pipe pressure at the slow rate.

12. In a fluid pressure brake, the combination with a brake pipe and equalizing reservoir, of means operated upon a reduction in pressure in the equalizing reservoir for effecting a reduction in brake pipe pressure, means for first effecting a reduction in equalizing reservoir pressure at one rate, means for then effecting a reduction in equalizing reservoir pressure at a faster rate, and means for supplying fluid under pressure to the brake pipe to compensate for leakage from the brake pipe, only while the first reduction in equalizing reservoir pressure is being effected.

13. In a fluid pressure brake, the combination with a brake pipe and equalizing reservoir, of a valve device operated upon a reduction in pressure in said equalizing reservoir for effecting a reduction in brake pipe pressure and manually operated means for varying the rate at which the pressure in the equalizing reservoir is reduced.

14. In a fluid pressure brake, the combination with a brake pipe and equalizing reservoir, of a valve device operated upon a reduction in pressure in said equalizing reservoir for effecting a reduction in brake pipe pressure and a manually operated valve for establishing communication in one position for venting fluid from the equalizing reservoir at one rate and for establishing communication in another position for venting fluid from the equalizing reservoir at another rate.

15. In a fluid pressure brake, the combination with a brake pipe and equalizing reservoir, of a valve device operated upon a reduction in equalizing reservoir pressure for venting fluid from the brake pipe, means for venting fluid from the equalizing reservoir, and a manually operated valve for establishing communication through which fluid is vented from the equalizing reservoir, said valve having different positions in which the rate is varied at which fluid is vented from the equalizing reservoir.

16. In a fluid pressure brake, the combination with a brake pipe and equalizing reservoir, of a valve device operated upon a reduction in equalizing reservoir pressure for venting fluid from the brake pipe, a reduction reservoir, means for venting fluid from the equalizing reservoir to the reduction reservoir, and manually operated valve means for varying the rate at which fluid is vented from the equalizing reservoir to the reduction reservoir.

17. In a fluid pressure brake, the combination with a brake pipe and equalizing reservoir, of a valve device subject to the opposing pressures of the brake pipe and equalizing reservoir and operated upon a reduction in equalizing reservoir pressure for venting fluid from the brake pipe, means normally operative to connect the equalizing reservoirs to the brake pipe upon an increase in equalizing reservoir pressure above that in the brake pipe, a source of fluid under pressure, and means operative upon effecting a reduction in brake pipe pressure for supplying fluid from said source to the brake pipe in case the equalizing reservoir pressure exceeds brake pipe pressure.

18. In a fluid pressure brake, the combination with a brake pipe and equalizing reservoir, of a valve device subject to the opposing pressures of the brake pipe and equalizing reservoir and operated upon a reduction in equalizing reservoir pressure for venting fluid from the brake pipe, said valve device being operative upon an increase in equalizing reservoir pressure above that in the brake pipe for connecting a passage with the brake pipe, a source of fluid under pressure, and means having one position in which the equalizing reservoir is connected to said passage and another position in which said source of fluid under pressure is connected to said passage.

19. In a fluid pressure brake, the combination with a brake pipe and equalizing reservoir, of a valve device subject to the opposing pressures of the brake pipe and equalizing reservoir and operated upon a reduction in equalizing reservoir pressure for venting fluid from the brake pipe, said valve device being operative upon an increase in equalizing reservoir pressure above that in the brake pipe for connecting a passage with the brake pipe, a source of fluid under pressure, and an application valve device adapted in release position to connect the equalizing reservoir with said passage and in application position to connect said source of fluid under pressure to said passage.

20. In a fluid pressure brake, the combination with a brake pipe and equalizing reservoir, of a valve device subject to the opposing pressures of the brake pipe and equalizing reservoir and operated upon a reduction in equalizing reservoir pressure for venting fluid from the brake pipe, said valve device being operative upon an increase in equalizing reservoir pressure above that in the brake pipe for connecting a passage with the brake pipe, a source of fluid under pressure, and an application valve device adapted in release position to connect the equalizing reservoir to said passage and in application position to establish communication through which fluid is vented from the equalizing reservoir and also to connect said source of fluid under pressure to said passage.

In testimony whereof we have hereunto set our hands this 28th day of November, 1927.

THOMAS H. THOMAS.
CLAUDE A. NELSON.